(12) United States Patent
Meijer

(10) Patent No.: US 8,918,517 B2
(45) Date of Patent: Dec. 23, 2014

(54) PUBLISH/SUBSCRIBE MASHUPS FOR SOCIAL NETWORKS

(75) Inventor: Henricus (Erik) Johannes Maria Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1042 days.

(21) Appl. No.: 12/485,308

(22) Filed: Jun. 16, 2009

(65) Prior Publication Data

US 2010/0318619 A1 Dec. 16, 2010

(51) Int. Cl.
  G06F 15/16 (2006.01)
  G06Q 10/10 (2012.01)
  H04L 29/08 (2006.01)
  G06F 17/30 (2006.01)

(52) U.S. Cl.
  CPC ............... *G06Q 10/10* (2013.01); *H04L 67/02* (2013.01); *G06F 17/30017* (2013.01)
  USPC ....................................................... 709/227

(58) Field of Classification Search
  CPC .......................... G06F 17/30017; H04L 67/02
  USPC ........................................... 709/204–206, 227
  See application file for complete search history.

(56) References Cited

U.S. PATENT DOCUMENTS

| | | | | |
|---|---|---|---|---|
| 8,082,291 B2* | 12/2011 | Gisolfi et al. | .................. | 709/201 |
| 2004/0046789 A1* | 3/2004 | Inanoria | .......................... | 345/748 |
| 2007/0094350 A1 | 4/2007 | Moore | | |
| 2008/0082539 A1 | 4/2008 | Doane et al. | | |
| 2008/0129725 A1 | 6/2008 | Stambaugh | | |
| 2008/0155440 A1 | 6/2008 | Trevor et al. | | |
| 2008/0222572 A1 | 9/2008 | Nathan et al. | | |
| 2008/0222599 A1* | 9/2008 | Nathan et al. | .................. | 717/107 |
| 2009/0210481 A1* | 8/2009 | Fletcher et al. | ............... | 709/203 |
| 2010/0257242 A1* | 10/2010 | Morris | .......................... | 709/206 |
| 2010/0268780 A1* | 10/2010 | Chakra et al. | .................. | 709/206 |
| 2011/0161409 A1* | 6/2011 | Nair et al. | ...................... | 709/203 |

OTHER PUBLICATIONS

Written Opinion of the Search Authority for PCT/US2009/045939.*
"About Pipes", retrieved May 6, 2006 at http://blog.pipes.yahoo.net/about-pipes.
"Creating Enterprise Mashups" retrieved on May 6, 2009 at http://www.gisuser.com/content/view/16874/28, GISuser.
"Denodo Releases Denodo Platform 4.1" retrieved on May 6, 2009 at http://gilbane.com/news/information_intgeration, Information Technology news: Information Integration Archives.
"Enterprise Mashups—The Icing on Your SOA", retrieved on May 6, 2009 at http://it.toolbox.com/blogs/madgreek/enterprise-mashups-the-icing-on-your-soa-28435.
"IBM Mashup Center" retrieved on May 6, 2009 at http://www-01.ibm.com/software/info/mashup-center, IBM Corporation.
Kirkpatrick, Marshall, "Gnip: Grand Central Station for the Social Web" retrieved on May 4, 2009 at http://www/readwriteweb.com/archives/gnip_grand_central_station.php.

(Continued)

*Primary Examiner* — Larry Donaghue
(74) *Attorney, Agent, or Firm* — Dan Choi; Judy Yee; Micky Minhas

(57) ABSTRACT

Described herein is a mashing technology that facilitates mashup creation over a plurality of publish/subscribe social network data stream. These mashing techniques that are tailored to managing content from disparate social networks. As described herein, these techniques include creating and using a set of operations that facilitate the creation of "mashups" over multiple publish/subscribe social network data streams.

20 Claims, 11 Drawing Sheets

(56) References Cited

OTHER PUBLICATIONS

Kirkpatrick, Marshall, "The Man Who Made Gmail Says Real-Time Conversation is What's Next", retrieved on May 4, 2009 at http://www.readwriteweb.com/archives/the_man_who_made_gmail_says_real-time_conver. . . .

"Microsoft Popfly" retrieved on May 5, 2009 at http://www.popfly.com/Overview.

"Sharing social activity streams across the Web: How Gnip fits in" retrieved on Apr. 28, 2009 at 25hoursaday.com/.../SharingSocialA. . . .

Van Kleek, et al., "AtomsMasher: PeRSSonalized Information Delivery and Management on the Web", from MS Search Report dated May 5, 2009 at http://eprints.ecs.soton.ac.uk/14827/2/atomsmasher.pdf, ECS/IAM-eprint14827.

"Why Mashups Matter" from MS Search Report dated May 5, 2009 from ftp://ftp.software.ibm.com/software/lotus/lotusweb/portal/why_mashups_matter.pdf, IBM Corporation.

Yahoo, "What is Pipes? . . . " retrieved on May 11, 2009 at http://pipes.yahoo.com/pipes/docs.

* cited by examiner

PUBLISH/SUBSCRIBE MASHUPS FOR SOCIAL NETWORKS

BACKGROUND

Currently there are many sites and forms of data from which consumers pull information or from which information is pushed to consumers. Sites are accessed via the internet or information is received via messages like emails and texts.

Although humans desire a connection with each other, and ways to keep-up with friends and relatives seem to be ever increasing, people may not have time to interact with each site regularly, may miss that which is important to them due to inconsistent access, or may lose important messages that they receive in the barrage of data coming to them. In short, people want the data they want . . . not all the rest.

Typically there are specific techniques to access various types of social data. Using the specific techniques, individual types of data may be managed, such as by creating a web mashup of blog data from several blogs. Currently web mashups are built from the ground up for each application with the goal to present all of information available from "mashed" web sites.

However, these conventional mashing techniques are not tailored to managing content from disparate social networks.

SUMMARY

A technology that facilitates mashup creation over a plurality of publish/subscribe social network data streams is described herein. Mashing techniques are described that are tailored to managing content from disparate social networks. As described herein, these techniques include creating and using a set of operations that facilitate the creation of "mashups" over multiple publish/subscribe social network data streams.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

Figure 1:
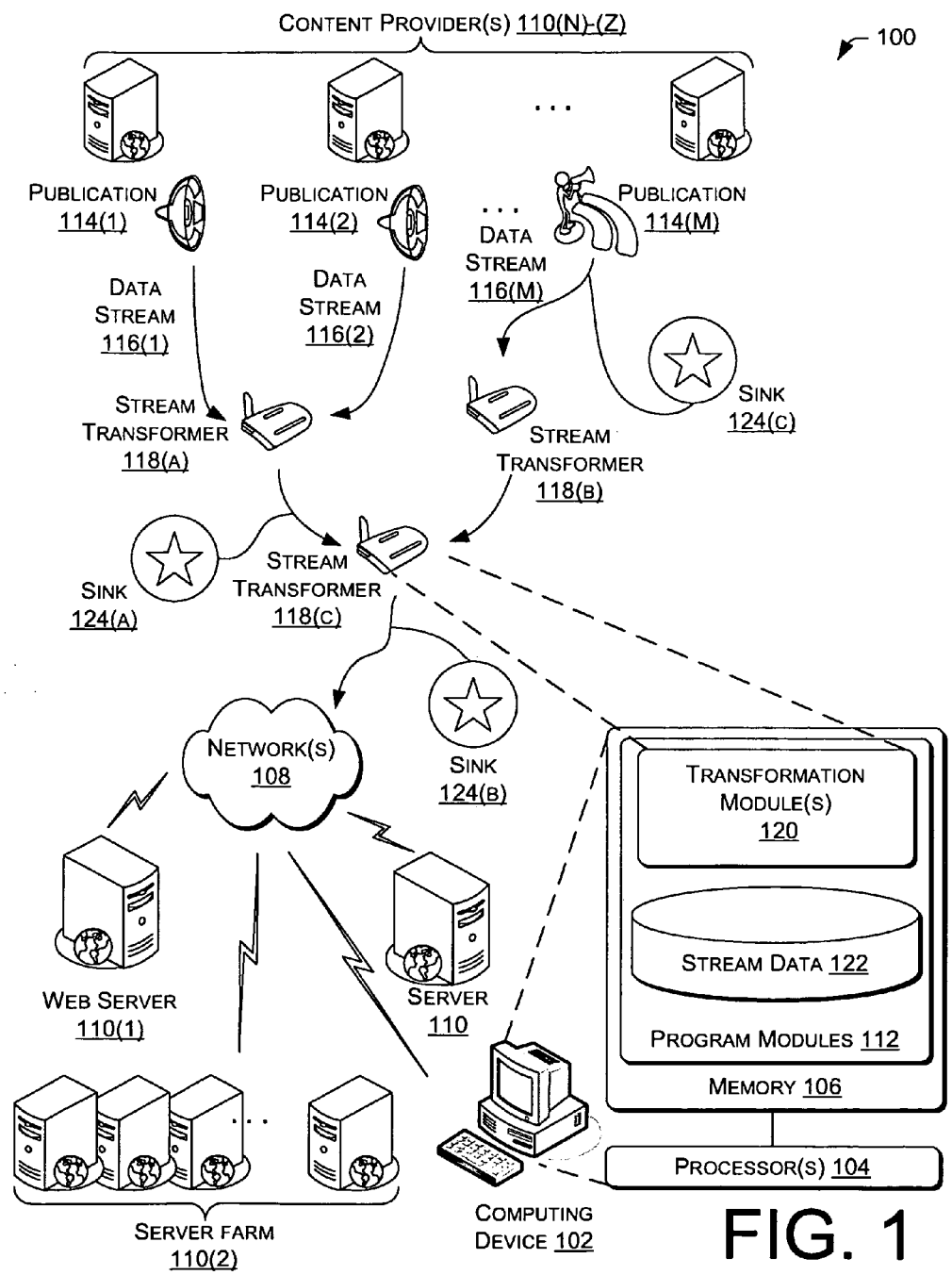
FIG. 1 is an overview showing illustrative aspects of an operating environment for implementing publish/subscribe mashups for social networks.

The detailed description is set forth with reference to the accompanying figures. In the figures, the left-most digit of a reference number identifies the figure in which the reference number first appears. The use of the same reference numbers in different figures indicates similar or identical items. A reference number having a parenthetical suffix (as in "104(1)" or "112(a)") identifies a species of the feature represented by the general reference number (e.g., "104" or "112"); further, use of the general reference number without a parenthetical suffix (as in "104" or "112") identifies the genus or any one or more of the species.

DETAILED DESCRIPTION

Overview

This disclosure is directed to techniques for creating and using a set of operations that facilitate the compositional creation of "mashups" over multiple publish/subscribe social network data streams. The described operations facilitate stream transformer operations on data items from multiple publish/subscribe social network data streams enabling tailored creation of an output stream for consumption.

Social networks are made up of multiple social network data streams to which an interested party can subscribe. For instance, a social network may be composed of a social networking website status-update stream, several RSS feeds for blogs, a multiple of micro-blog streams, and various image and video sharing groups.

The described techniques, systems, and tools created thereby, facilitate transformations of social network data streams such as micro-blogs (e.g., Twitter™, Plurk, Jaiku, Ping.fm™), social network streams (e.g., Facebook™, MySpace™, LinkedIn™, XING™), photo sharing streams (e.g., Flickr™, Picasa™, Shutterfly™), rich site summary (RSS) feeds (e.g., blogs, traffic information, government data, news, weather information, health information, home security monitoring, stock prices, seismic information), other file sharing streams (e.g., Pownce™, BitTorrent), additional transformed output streams, global positioning system (GPS) data, financial information (e.g., banking, credit card, bills), e-commerce recommendations, coupons, restaurant reviews, and other Web 2.0 streams that use the Internet as a platform (e.g., lifestreaming services, Socialthing™, Profilactic™). The described techniques and systems additionally facilitate transformations of, or including, other data types and/or streams such as database data, calendar information, short messaging service (SMS) message streams, multimedia messaging service (MMS) message streams, instant messaging streams, and email streams.

Social network data streams come from various sources such as RSS services, blog publishers, micro-bloggers, social networking sites, photo sharing services, file sharing services, additional transformation services or tools, and other Web 2.0 services. Other sources of types of data and/or streams operated on by the publish/subscribe mashups for social networks system include: short messaging services, multimedia messaging services, instant messaging services, and email services.

An environment in which these tools may enable these and other techniques is set forth first below. Additional sections describe various inventive techniques and exemplary embodiments of the tools. These sections describe exemplary ways in which the inventive tools enable implementing publish/subscribe mashups for social networks such that output is tuned for human consumption and/or tailored as a new social network data stream.

Exemplary Operating Environment

Before describing the tools in detail, the following discussion of an exemplary operating environment is provided to assist the reader in understanding at least one way in which various inventive aspects of the tools may be employed. The environment described below constitutes but one example and is not intended to limit application of the tools to any one particular operating environment. Other environments may be used without departing from the spirit and scope of the claimed subject matter.

FIG. 1 illustrates one such operating environment generally at 100 comprising at least a first computing device 102 having one or more processor(s) 104 and computer-readable media such as memory 106. Computing device 102 may be one of a variety of computing devices, such as a cell phone, laptop computer, desktop computer, personal digital assistant, or server. Each computing device having at least one processor capable of accessing and/or executing instructions embodied on the computer-readable media. In at least one embodiment, the computer-readable media comprises or has access to a browser, which is a module, program, or other entity capable of interacting with a network-enabled entity. The computing device may also include input/output devices including a keyboard, mouse, microphone, printer, monitor, and speakers (not shown) usable to implement one or more embodiments of the tools described herein.

The operating environment 100 also comprises one or more network(s) 108 and computing device server(s) 110. The network 108 enables communication between the computing device(s) 102 and the server(s) 110, and can comprise a global or local wired or wireless network, such as the Internet, a local area network (LAN), or an intranet. Computer-readable media of computing device 102 comprises or has access to program modules 112 including a browser, which is a module, program, or other entity capable of interacting with a network-enabled entity. In aspects of several embodiments server(s) 110 may be implemented as web server 110(1), in a server farm 110(2), and as content provider(s) 110(N)-(Z).

In the illustrated embodiment content providers are social network stream sources, also called publishers, publishing social network data streams. In a non-illustrated aspect of at least one embodiment social network data streams may be published via computing device 102 or others of the illustrated servers 110. In the illustrated environment data items being published are illustrated at 114, into data streams 116. Although the illustrated content providers are presented as a source for an individual publication of a single data stream, it is to be understood that a provider may be a source of a plurality of publications 114 of a plurality of data streams 116, and that the represented publications 114 and data streams 116 may represent disparate types of data streams, any of which are transformed by stream transformers 118. In some embodiments, stream transformers 118 may produce their own output data streams 116, as illustrated by stream transformers 118(A) and 118(B), which as illustrated may be further transformed as shown by stream transformer 118(C).

Furthermore, stream transformers 118 implement transformation module(s) 120. Thus, in some embodiments, stream transformers 118 may be included in a computing device such as computing device 102, while in at least one embodiment stream transformers 118 may be implemented independently as illustrated. In at least one embodiment, stream transformers 118, may be included in and implement transformation module(s) 120 via server 110. Furthermore, in at least one embodiment, memory 106 may store stream data 122 both before and after transformation.

In some embodiments stream transformers 118 and transformation modules 120 are implemented via listeners 124, also called sinks. In the instant context, sinks 124 represent a specially programmed computing device based on computing devices 102 or 110. As illustrated, sinks monitor or listen to a data stream 116, and when implemented operatively coupled with a stream transformer 118 may produce their own output data streams 116. Although sinks 124 are illustrated separately from computing devices 102 and 110, and stream transformers 118, it is understood that the depiction is purely for illustrative purposes, and not intended as a limitation.

Aspects of computing devices, such as computing devices 102 and 110(1)-(Z), in at least one embodiment include functionality for creating stream transformers 118 to use transformation modules 120. For example, as shown from computing device 102, program modules can be implemented as computer-readable instructions, various data structures, and so forth via at least one processing unit to configure a computer having memory to create and use a set of operations that facilitate the creation of "mashups" over multiple publish/subscribe social network data streams as discussed regarding FIG. 4, below.

Figure 2:
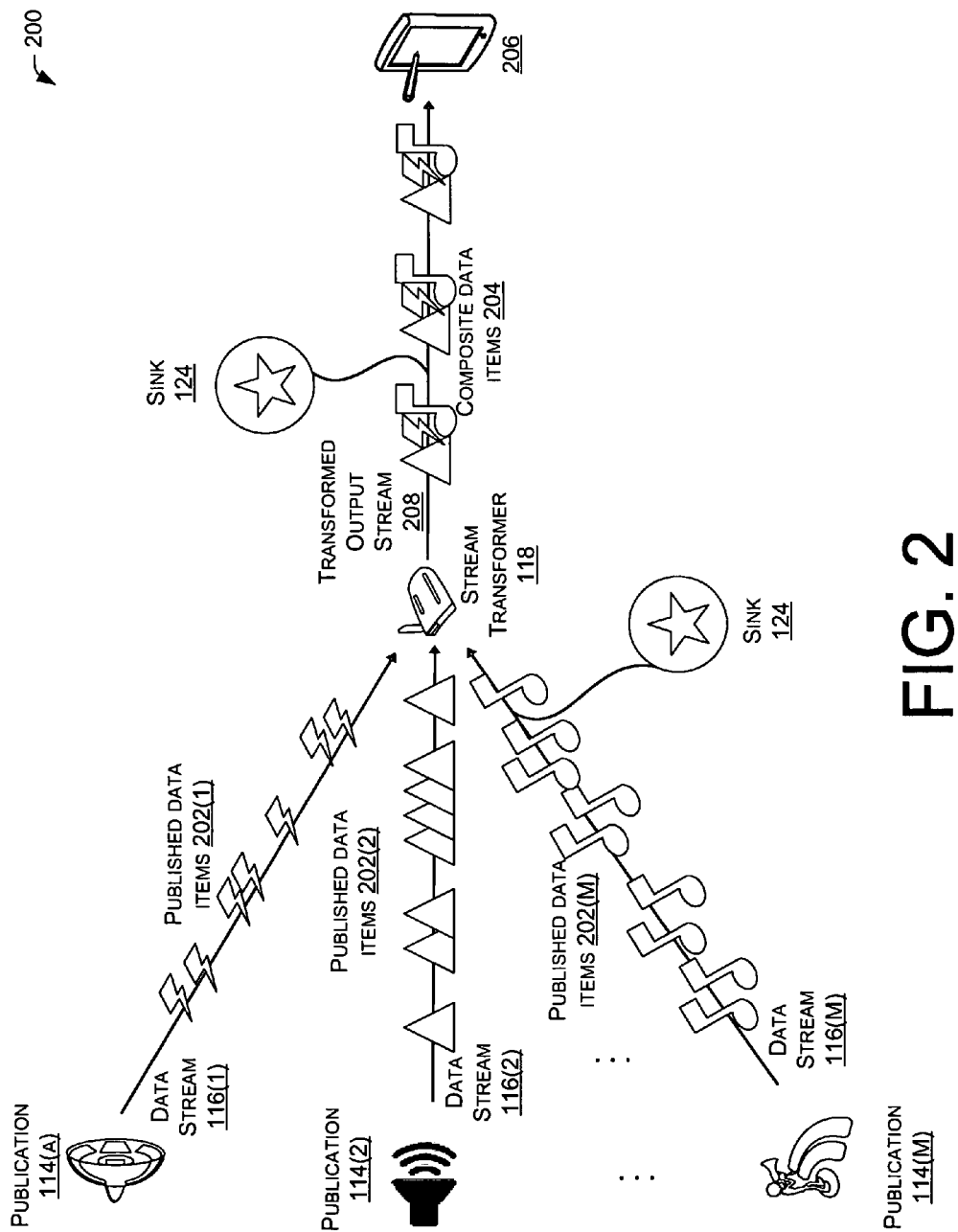
FIG. 2 is an overview showing illustrative aspects of an architecture for implementing publish/subscribe mashups for social networks.

FIG. 2 illustrates aspects of an architecture for implementing publish/subscribe mashups for social networks generally at 200. In the illustrated embodiment, various publications 114 produce a variety of types of data streams 116 of different published data items 202. The data items from the incoming streams may be listened to by one or more sinks 124, and as illustrated, are received by stream transformer 118. In the embodiment shown, stream transformer 118 performs sampling and aggregation transformations to produce and publish an output stream with composite data items 204 that are well timed and structured for human consumption. In at least one embodiment such timing and structuring is configurable and may be based in part on a consumer's consumption device 206. Consumption device 206 may be one of a variety of computing devices similar to 102, such as a cell phone, laptop computer, desktop computer, personal digital assistant, or server. In some embodiments, the transformed output stream 208 may be monitored by a sink 124, where additional transformations may occur. In at least one embodiment, the addition of a sink 124 to monitor a transformed and/or composed output stream, such as 208, operates to cause a new sink 124 to be created to monitor each of the source streams from which the transformed output stream 208 is formed.

As illustrated by stream 116(2) and published data items 202(2), social network data may come in bursts, e.g., a blog may generally have one post per day but suddenly receive 20 in an hour. Additionally, micro-blog "tweets" illustrated on data stream 116(M) may be virtually constant as shown by published data items 202(M), come at inopportune times, or spike due to a particular event such that they are arriving so quickly that a consumer cannot read them. Other types of social network data may be published at whatever rate the publisher chooses. Stream transformer 118 turns chaotic input into customized structured output that the consumer wants 208.

Stream transformer operations include several categories of transformations. In at least one embodiment, more than one transformation from one or more categories may be combined to compose new output streams based on social network data. Compositional transformations over all of these messages from a variety of sources allow control over the stream of data that otherwise may become chaotic and overwhelming for consumers.

Figure 3A:
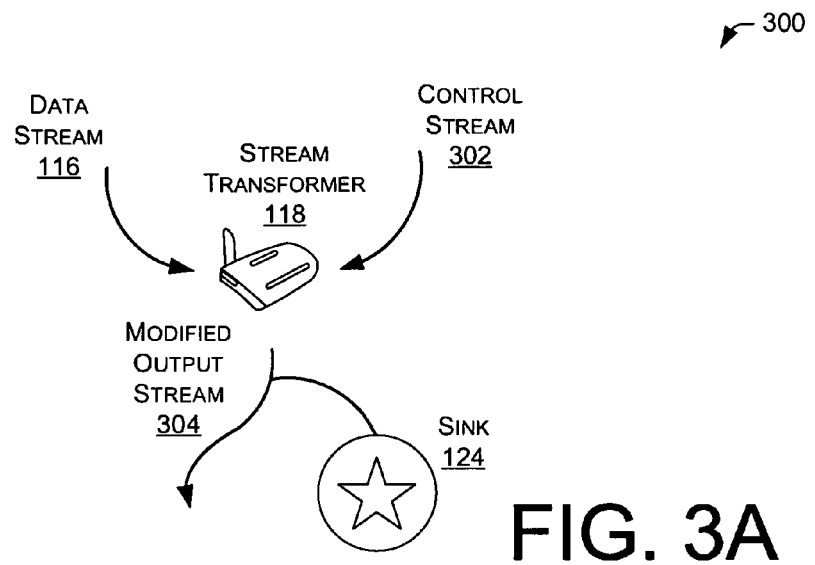
FIG. 3A is an overview showing additional illustrative aspects of an architecture for implementing publish/subscribe mashups for social networks.

FIG. 3A shows additional illustrative aspects of an architecture for implementing publish/subscribe mashups for social networks generally at 300. In the example illustrated, stream transformer 118 receives data stream 116 and control stream 302, and performs a transformation to produce modified output stream 304. In some embodiments, a control stream 302, as in this example, may serve a predicate to control the transformations to produce the modified output stream 304.

Figure 3B:
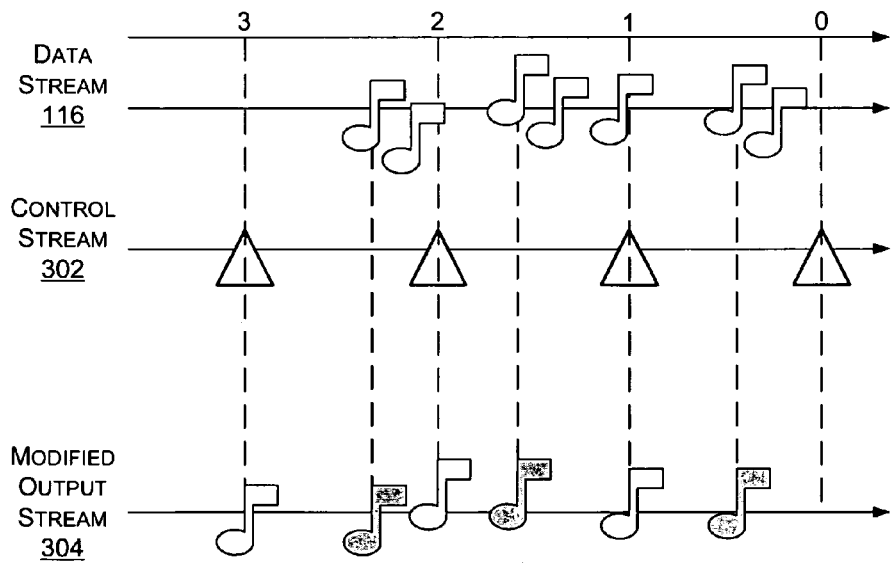
FIG. 3B is a data chart showing an illustrative transformation of social network data performed by the architecture of FIG. 3A.

FIG. 3B shows illustrative transformation of social network data performed by the architecture of FIG. 3A. A sampling transformer takes an incoming social network data stream 116 and samples the stream at regular intervals. In the illustrated embodiment, the sample rate is based on the control input stream 302. Thus, the modified output stream 304 publishes the most recent value on the input stream during the sampling period, if any. In the example shown, no value was available at time 0, as illustrated the most recent value between time 0 and time 1 was published at time 1, and the most recent values were published at times 2 and 3. In another aspect of the illustrated embodiment, the control input stream 302 may also be used to modify other aspects of the behavior of the transformation, for instance by increasing or decreasing the sample rate. Note that each stream transformer 118 may take a control input stream such as 302 that can be used to modify the behavior of the transformation.

Exemplary Computing Device

Figure 4:
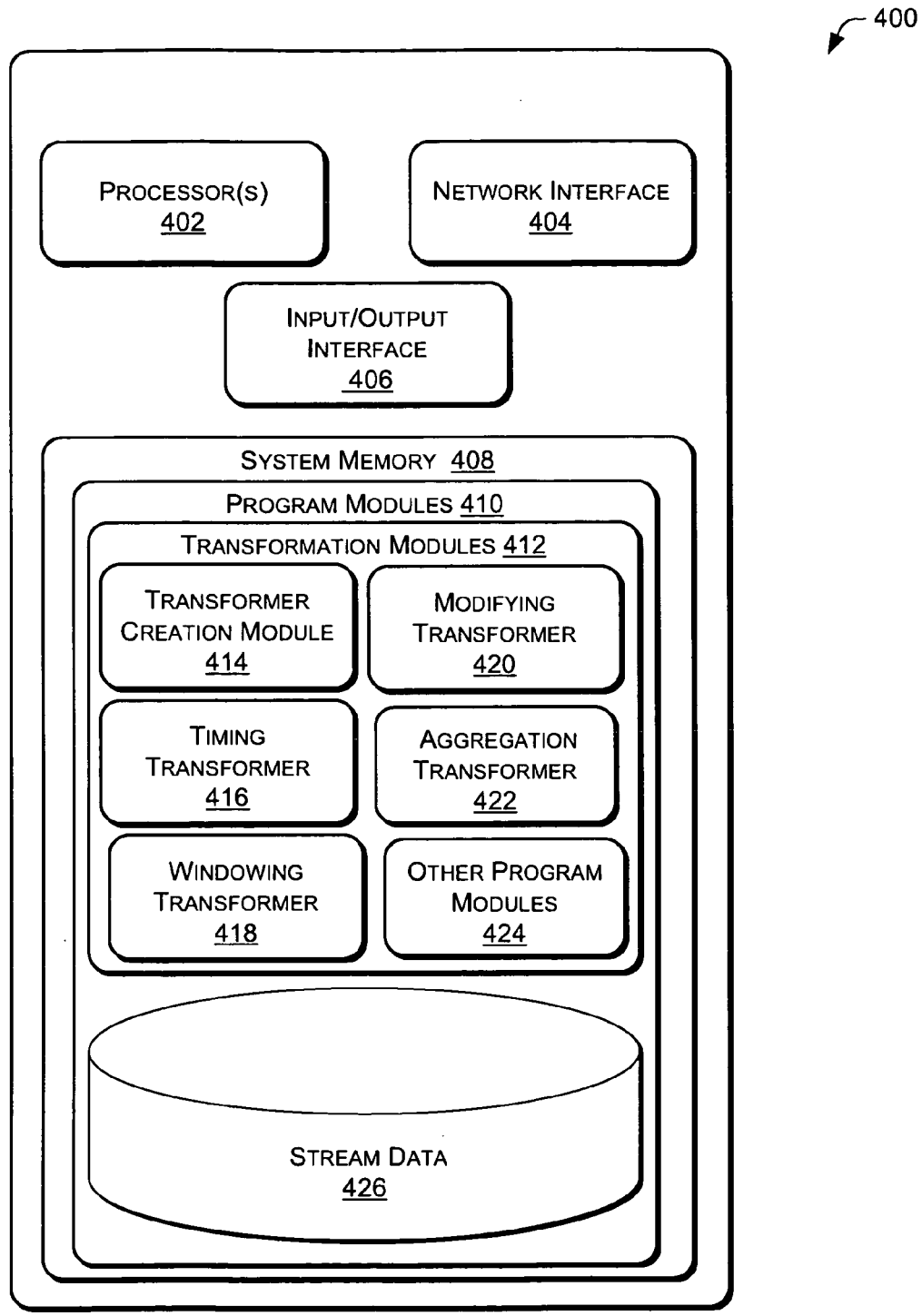
FIG. 4 illustrates an exemplary computing device of one embodiment for implementing publish/subscribe mashups for social networks.

FIG. 4 illustrates an exemplary computing device at 400 that can be used to implement aspects of publish/subscribe mashups for social networks as introduced in the context of the illustrated environments. For example, this computing device 400 can represent one or more of the computing devices 102, 206, stream transformers 118, listener/sinks 124, and computing device servers 110. (And insofar as the computing device 400 includes conventional computing hardware, FIG. 4 also represents functionality that can be used to implement other computer-related aspects of the environments shown in FIG. 1, FIG. 2, and FIG. 3 such as equipment of web server 110(1), server farm 110(2), and content provider(s) 110(N). The computing resources shown in FIG. 4 can be implemented at a single site or distributed over multiple sites.

The computing device 400 in this example includes at least one processing unit 402, network interface 404, input/output interface 406, and system memory 408. Depending on the configuration and type of computing device 400, the system memory 406 can be implemented as or may include volatile memory (such as RAM), nonvolatile memory, removable memory, and/or non-removable memory, implemented in any method or technology for storage of information, such as computer-readable instructions, data structures, program modules, or other data. Also, the processor(s) 402 may include onboard memory in addition to or instead of the memory 408. Some examples of storage media that may be included in memory 408 and/or processor(s) 402 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor(s) 402.

In the context of the present subject matter, the program modules 410 include transformation modules 412, supplying the functionality for implementing publish/subscribe mashups for social networks and other aspects of the environments of the earlier described figures. In general, the program modules 410 can be implemented as computer-readable instructions, various data structures, and so forth that configure a computer to create and execute transformations to achieve publish/subscribe mashups for social networks. The program modules 410 and transformation modules 412, supplying the functionality for implementing publish/subscribe mashups for social networks in some embodiments are created in an integrated development environment such as Microsoft Visual Studio and/or Eclipse. The computer-readable instructions can be expressed using any programming technology such as object-oriented languages (e.g., C#, Visual Basic, Java), scripting languages (e.g., Perl, Python, JavaScript, PHP, Lua), functional languages (e.g., Lisp, SML, F#, Haskell), procedural languages (e.g., C, C++, Objective-C, Cobol, Fortran), declarative languages (e.g., SQL, Prolog, DataLog). The instructions can also include markup language content (e.g., XML).

In some embodiments the functionality for implementing publish/subscribe mashups for social networks includes multiple programming technologies. For example, Code Example 1, below presents two non-limiting examples of programming technologies including the object-oriented language Visual Basic using a language integrated query (LINQ) and the procedural language C#.

```
// An example in Visual Basic using LINQ
    From StockInfo In MSFT.Sample(EachMinute)
    Aggregate Max(StockInfo.Price)
// An example in C#
    Email(name1@company.com).Where(message =>
message.From.Contains("name2@company.com")).GroupBy
    (message => message.SentDate.Week)
```

Code Example 1

Examples of transformation modules 412 are illustrated including, transformer creation module 414, timing transformer 416, windowing transformer 418, modifying transformer 420, and aggregation transformer 422, although combinations thereof and other transformation modules are contemplated. Furthermore, other program modules may be included as shown at 424.

Computing device 400 can include additional features or functionality. For example, the computing device 400 is illustrated with a data store of stream data 426, but it can also include additional data storage devices, such as removable storage and/or non-removable storage 314 (e.g., magnetic disks, magnetic tape, optical disks, static RAM devices, and so forth), along with associated media reading/writing functionality.

Figure 5:
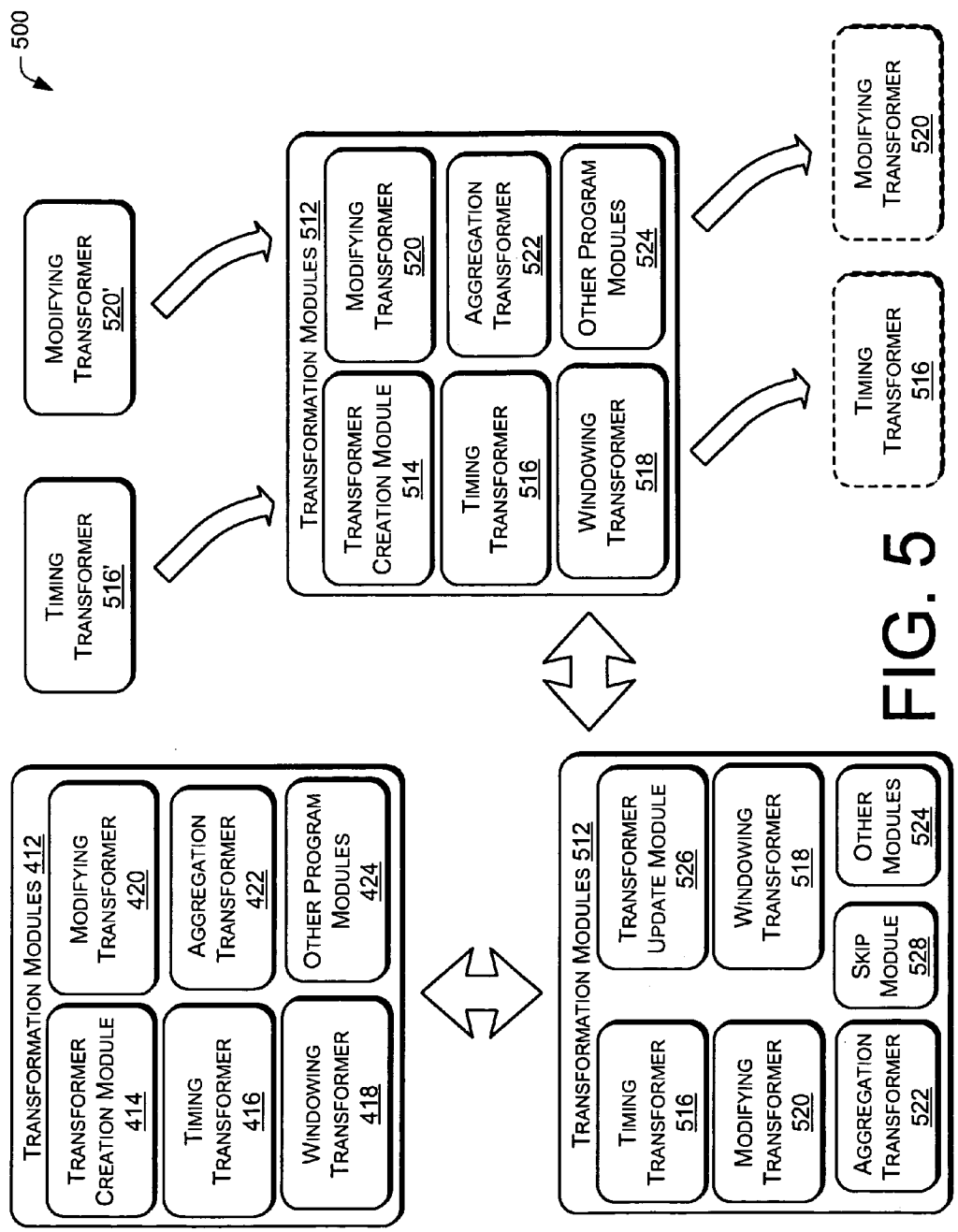
FIG. 5 illustrates additional aspects of transformation modules for implementing publish/subscribe mashups for social networks.

FIG. 5 illustrates additional aspects of transformation modules at 500 that can be used to implement aspects of publish/subscribe mashups for social networks as introduced in the context of the illustrated environments. Transformations in publish/subscribe mashups for social networks are compositional. Unlike traditional web mashups that must be built from the ground-up for each application, the instant transformations are flexible. Transformation components and modules are interchangeable and reconfigurable, and updateable, thereby providing a powerful tool to control a transformed output stream composed from asynchronous, often chaotic incoming data items from social network data streams.

Transformation modules are standardized to be reconfigurable. As illustrated in FIG. 5, the transformation modules illustrated in FIG. 4 operate as building blocks for one another. Transformation module 512 demonstrates each module from transformation module 412 having been replaced over time. For example, timing transformer 416 has been replaced by modifying transformer 520, and aggregation transformer 422 has been replaced by windowing transformer 518. Additionally, modifying transformer 420 has been replaced by transformer update module 526 and a skip module 528 has been added. Notably, many additional replacements and additions are possible.

Furthermore, transformation modules are updateable. In some embodiments, both modules and tools may be updated or modified over time. For example, transformation module 512 is shown receiving updates to timing transformer 516, and modifying transformer 520, the updates being illustrated as 516' and 520', with the other versions, 516 and 520 being discarded, In at least one embodiment, subscribers may automatically receive updates to modules, and the update transformation may be composed such that the updates are received on a predetermined schedule at least partially independent of when the updates arrive on an incoming data stream.

Although the illustrated modular level implies a certain granularity, the reader should appreciate that individual tools are interchangeable and reconfigurable within each module.

Exemplary Operation

The following discussion describes exemplary ways in which the tools implementing publish/subscribe mashups for social networks enable tailored creation of output streams for consumption. To facilitate explanation, the processes are described with reference to the environments and architectures of FIG. 1, FIG. 2, and FIG. 3, and the computing device of FIG. 4.

Non-limiting examples of pseudo code are provided for illustration. Although basic pseudo code examples are illustrated, the reader should appreciate that compositional creation of "mashups" over multiple publish/subscribe social network data streams involves advanced coding and development techniques. For example, in Code Example 2, pseudo code for a publish/subscribe stream steam and a listener type are presented. Similarly, pseudo code for publishing a value to such a listener is presented. Correspondingly, pseudo code for subscribing a listener to a publish/subscribe stream is presented.

```
// pseudo code for a Publish/Subscribe stream
type PubSubStream
{
    Subscribe(Listener)
}
// pseudo code to publish a value to such a
listener
type Listener
{
    OnPublish(value)
}
// pseudo code for subscribing a listener to a
pubsub stream
Source.Subscribe(
    OnPublish(value)
    {
        Print("thanks for telling me "+value);
    }
)
```

Code Example 2

In some embodiments one or more of a plurality of stream transformers 118 receive incoming streams 116 via publication 114 from a plurality of content providers or publishers 110. The stream transformers 118 transformers may perform a multitude of transformations from several categories including timing transformations, windowing transformations, modifying transformations, and aggregation transformations. An additional non-limiting example of pseudo code is provided for illustration as Code Example 3. The example illustrated at Code Example 3 builds on the pseudo code of Code Example 2, to show filtering a source stream using a predicate. As shown in Code Example 3, a new target stream may be created when a listener is added to a stream, and the new listener is added to the source stream that forwards a value it receives to the new listener, provided the predicate is true.

```
// Filter source stream using a predicate
PubSubStream Filter(PubSubStream source,
Predicate pred)
{
    Subscribe(listener)
    {
        Source.Subscribe
        (
            On Publish(Value)
            {
                if(pred(value)==true)
                {
                    Listener.OnPublish(value)
                }
            }
        )
    }
}
```

Code Example 3

Upon completion of the transformation, an output interface facilitates serving an output stream such as 208 and/or 304. In some embodiments, the output stream is served to consumers via consumption devices and/or to computing devices, servers, sinks, other stream transformers, and such network enabled entities. In at least one embodiment, an endpoint adapter is employed.

Figure 6:
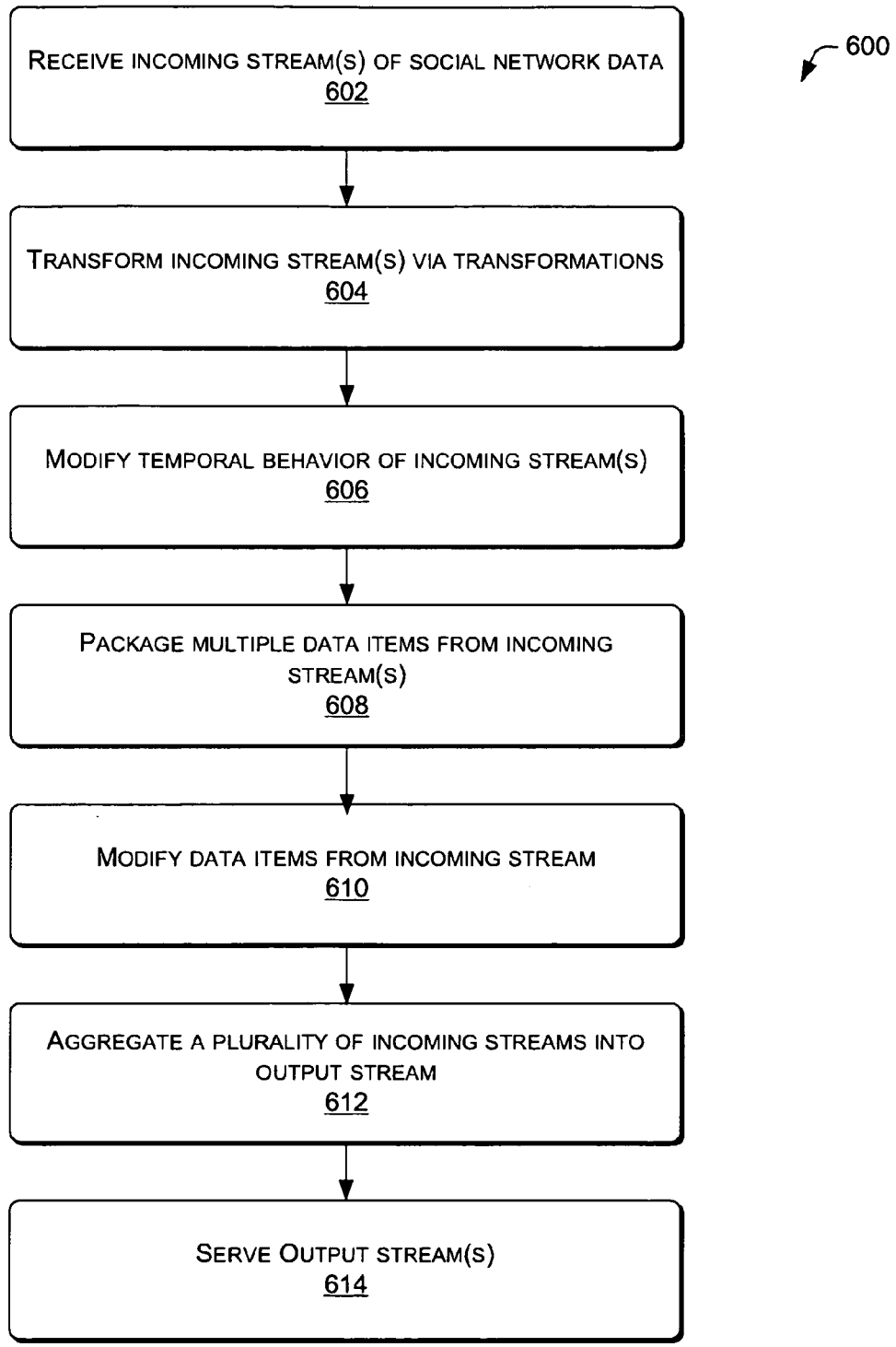
FIG. 6 is a flow diagram showing an illustrative process of implementing publish/subscribe mashups for social networks.

FIG. 6 shows an exemplary process 600 implementing publish/subscribe mashups for social networks enabling tailored creation of an output stream. A device such as a listener/sink 124, computing devices 102 or 110, and/or stream transformer 118 receives an incoming stream of social network data 116 at 602. In the illustrated embodiment, the incoming stream 116 begins transformation at 604. Timing transformers modify the temporal behavior of the incoming stream 116 at 606. Windowing transformers package together multiple data items 202 from the incoming stream 116 based at least in part on time or other criteria at 608. Modifying transformers remove or otherwise modify data items from the incoming stream 116 at 610. Aggregation transformers combine a plurality of the incoming streams 116(1)-(M) into the output stream at 612. The output stream is served at 614. Additional details regarding exemplary transformations are presented in the discussion of FIGS. 7-10, below.

Figure 7:
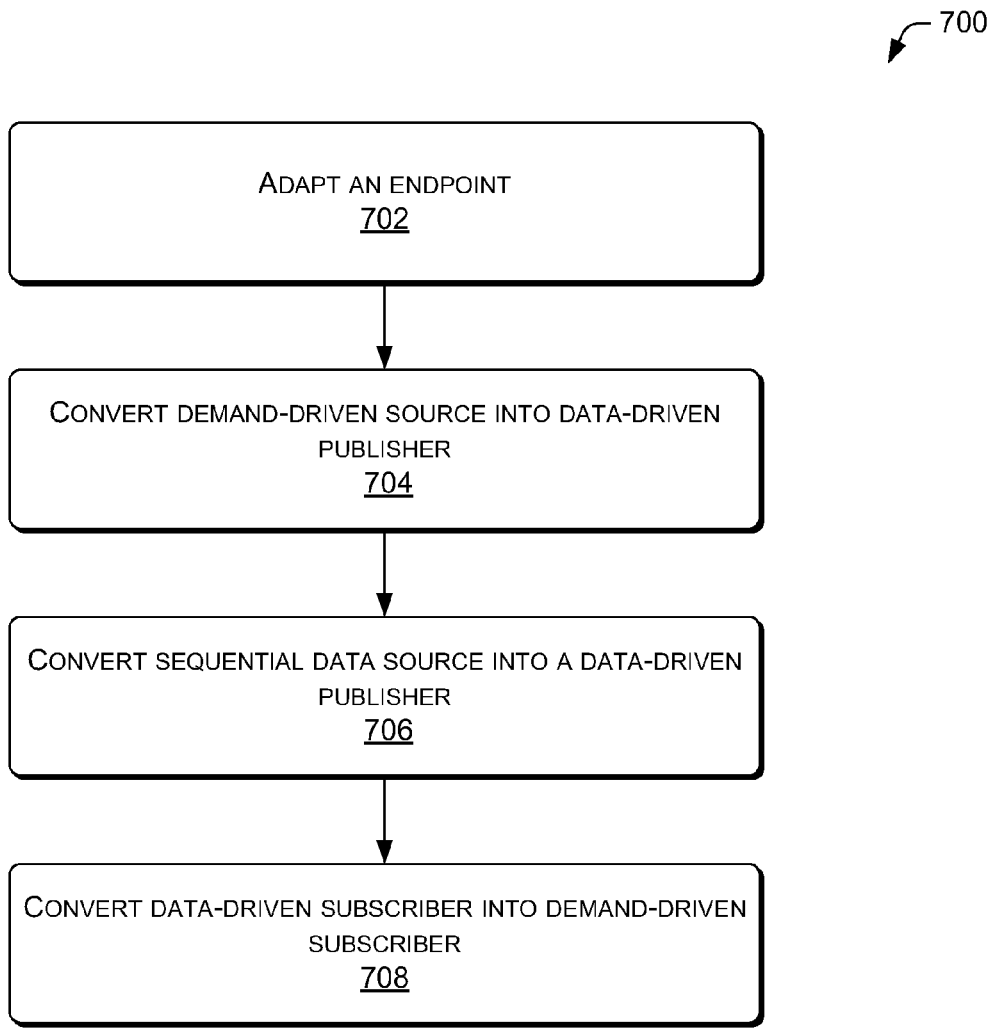
FIG. 7 is a flow diagram showing additional aspects of an illustrative process of implementing publish/subscribe mashups for social networks.

FIG. 7 shows an exemplary process 700 including endpoint adaptation at 702. In multiple embodiments, endpoint adaptation includes transformations at a sink or listener involving buffering of data items from the incoming social network data stream and streaming the items on the output stream. In some embodiments, conversion of a demand driven source into a data driven publisher is enabled, as is illustrated at 704. While in some embodiments, a source conversion adapter facilitates data sources converting a sequential data source into a data-driven publisher as shown at 706. In at least one embodiment a sequential data source comprises a relational database. This enables a composition of social network data with other types of data and/or transformation of social network data into other types of data. For example, a consumer may subscribe to an incoming social network data stream and have the incoming social network data stored in a relational database. As another example, a stream may be created and published using a relational database as a source. In an implementation of this example, a person may send a micro-blog message that s/he is planning a week-long vacation starting a particular day. A sink at her company may perform a composed transformation on the micro-blog stream to identify that the message is from her, join the message with her calendar and/or her employment file data stream, integrate her request with other vacation requests from her department, and generate an output stream including a vacation pay request that may in turn be saved in a relational database. Additionally, in multiple embodiments, a sink conversion adapter facilitates converting a data-driven subscriber into a demand-driven subscriber at 708.

Figure 8:
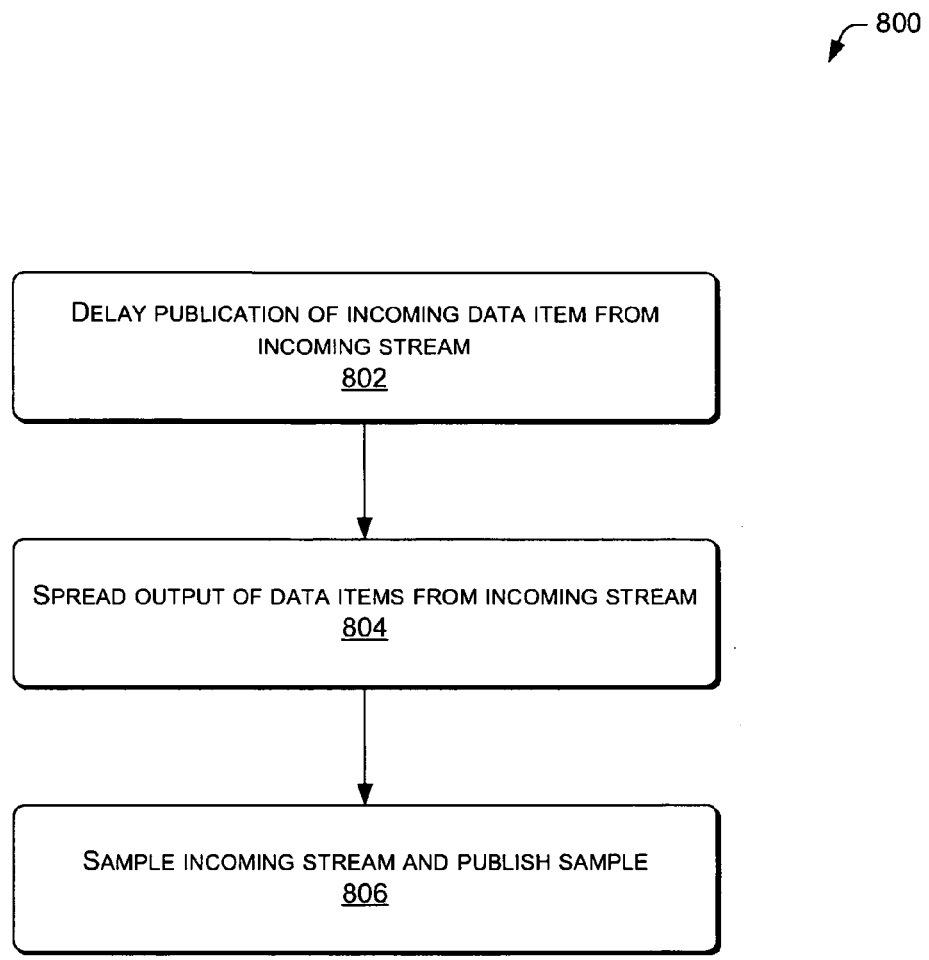
FIG. 8 is a flow diagram showing additional aspects of an illustrative process of implementing publish/subscribe mashups for social networks.

FIG. 8 shows an exemplary process 800, which, in some embodiments may be incorporated in whole or in part in process 600 at 604 and/or 606. Although some content providers publish according to a fixed schedule, many social network sources publish randomly and repeatedly with vastly varying degrees of importance. Indeed, the importance of what is published may fluctuate greatly for individual sources depending on world events or events in their personal lives. In some embodiments, a delay transformer delays publication of each incoming data item from the incoming stream for a predetermined time at 802. In at least one embodiment, the predetermined time is configurable by a consumer, a control stream, and/or another transformer. Thus a timing transformer 416 having delay functionality can be configured to deliver content at predetermined times. This allows consumers to keep a consumption device such as 206 on or active in order to get particular communications, while holding delayed incoming social network data until they are ready to consume it. Additionally, in at least one embodiment a delay transformer can be activated to delay a contributing or publishing to a social network data stream such as by automatically delaying sending a communication or delaying making the communication available to others.

A spread transformer operates to spread output of the data items from the incoming stream over time with a consistent time delta between the data items at 804. Spread transformation serves as a type of delay of incoming social network data. However, the configurable delta for spread transformation is typically shorter than that for delay transformation. Spread transformation evens out bursts of data, such as the burst of four published data items 202(2) shown in FIG. 2. In at least one example, a spread transformer facilitates storing a current spread of the incoming data at the consumption device 206, until the next spread arrives to replace it.

In several embodiments, a sample transformer samples the incoming stream at predetermined intervals and publishes a selected data item from the incoming stream during a predetermined sampling period at 806, such as a data item from each interval during the predetermined sampling period. In various embodiments the sample transformer is dormant at times other than when sampling occurs. In at least one embodiment the sample transformer is not dormant, and instead monitors the incoming stream reserving publishing the selected data item monitored for when the predetermined sampling interval occurs. In one example the selected data item from the incoming stream comprises the most recent data item during the predetermined sampling period. However, in the event the incoming stream lacks a data item during the predetermined sampling period, the transformer may be configured to publish the most recent data item from the previous predetermined sampling period. In another example, if the incoming stream lacks a data item during the predetermined sampling period, no data item is published corresponding to the predetermined sampling period, and the output stream may slow commensurately, or a data item from another stream may be substituted.

In at least one embodiment, a sampling transformation may employ a rate control stream at a sink 124 to control, at a configurable time span, when incoming data is sampled. For example, sink 124 listens to a data stream 116, and using a sampling transformer configured at ten minute intervals, produces as output for consumption the content accessed by the sink at the time the interval changes, the rest of the items on the data stream outside the interval are discarded. In at least one embodiment, the sampling rate may be dynamically configured via a feedback loop, for example based on consumer behavior. In this example, a sampling transformer may be configured to sample ten times per hour, but based on the user only accessing three content items in the majority of hours over a previous time frame (e.g., day, week, month, etc), feedback may cause the sampling rate to be adjusted down thereby conserving resources. In an alternate example, a consumer or administrator may proactively dial the sample rate down in response to stresses in the system.

Figure 9:
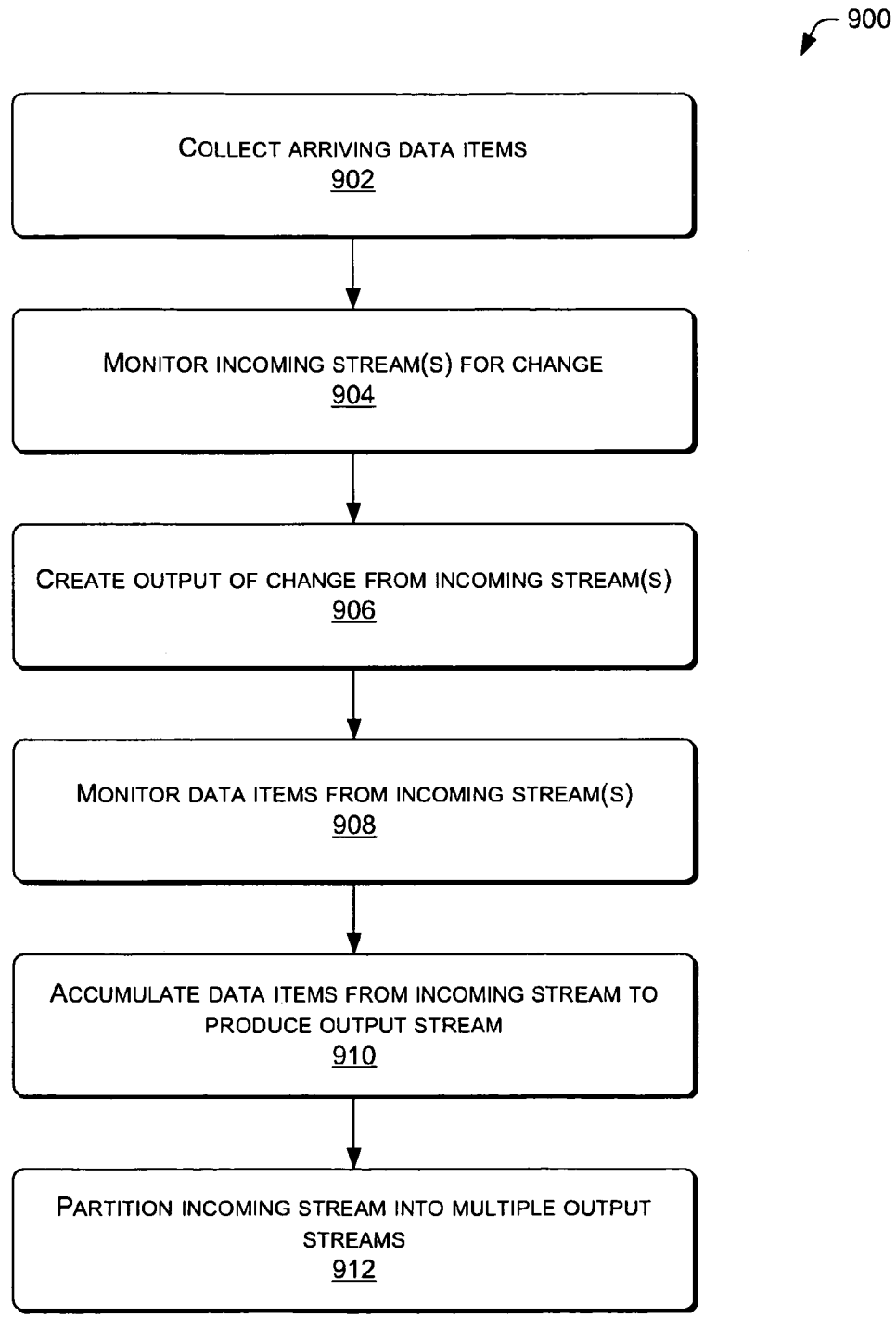
FIG. 9 is a flow diagram showing additional aspects of an illustrative process of implementing publish/subscribe mashups for social networks.

FIG. 9 shows an exemplary process 900, which, in some embodiments may be incorporated in whole or in part in process 600 at 604 and/or 608. In some embodiments, a time-window transformer collects arriving data items from the incoming stream for a predetermined period of time at 902. Time-window transformers may be implemented in multiple flavors. For example, a jumping time-window transformer may be created such that data items appear in one time-window collection only, e.g., data items from week 22, or collected by the window of time which may be set at a day, a week, a month, etc. A jumping window will present, for example, week 10 data, and then shift to week 11 data, week 12 data, and so on. Alternately, a sliding time-window transformer may be created such that a new collection is created whenever a data item appears or disappears from the incoming stream. In one example, a window may slide over a configurable period, such as seven days. The window slides each day, and the old data is no longer available in the window. In another example, the window may be set to expose n items for a week. When item n+1 arrives, first-in-first-out is applied to maintain the number of items in the window at n. Thus, the new window contains the n most current elements.

In some embodiments, a difference transformer monitors the incoming stream for change at 904, by capturing the change of the data based on snapshots of the window at a moment in time. The timing of the snapshot captures data at that instant. Thus, numerically, for example:

$$7\text{---}3\text{---}8\text{---}5\text{--}\Delta\text{--}(+4)\text{--}(-5)\text{--}(+3).$$

A difference transformer may also provide an output stream based on the difference being above a configurable threshold, and may operate on abstract data such as producing output containing positive communications or negative communications meeting a predetermined threshold. This transformation is particularly useful in aiding consumers escape from the noise that over communication becomes.

People are interested in change. In some embodiments, a difference transformer may provide an output stream at 906, for example, based on when the weather is predicted to vary by more than five degrees, or when the sun is expected to come out while it is currently overcast, raining, etc. Additionally, difference transformers may be configured to perform different operations in the event there is not a difference in the input stream. For example, a difference may create a default output stream or may refrain from creating an output stream at all until a difference occurs.

As mentioned above, compositions of transformations produce synergistic benefits for consumers. Expanding on the weather example above, a composition of difference and temporal transformations enables an output stream that may be more important for times when people make decisions like preparing to leave for work in the morning or for driving home. A window transformation of the weather data is obtained for a time period, the remaining weather data is discarded, and the output presents the differences over what data is left. Thus, based on output composed from transformations of the predicted weather during the two hours before and after work, one may decide to take an umbrella or sunscreen, or realize that s/he must leave the house early due to weather conditions in order to be on time for an appointment. In some embodiments, a difference transformer monitors the incoming stream for change at 904

In multiple embodiments, an integration transformer monitors data items at 908 and accumulates the data items from the input stream at 910. In an alternate embodiment, integration transformer monitors differences in the data items from the input stream and accumulates the differences of the data items to produce the output stream. As another example, integration transformation may account for proximity by accumulating data items appearing next to each other.

In some embodiments, a grouping transformer partitions the incoming stream into multiple output streams based at least in part on a grouping criterion at 912. In an aspect of at least one embodiment, the transformers employed in process 900 also create an output stream of their respective transformations. In at least one embodiment, the grouping transformer partitions the input stream into multiple output streams based at least in part on a grouping criterion whereby one or more output streams comprise multiples of a particular data item from the input stream at 912. In various embodiments the grouping transformer maintains a set of groups and puts incoming messages into these groups to which subsequent listeners subscribe.

For example, from an incoming photo stream, a grouping transformer may produce multiple output streams, such as for black-and-white, and color. The incoming data stream may be chaotic, randomly mixed content; the grouping transformer structures the output into the proper bucket. Another alternative may have only one output stream, but that output stream contains groups of color photos followed by groups of black-and-white photos. In such embodiments, the grouping may be based on an analysis of the number of a particular type of photo that has arrived on the incoming stream. For example, if one receives many more color than black-and-white photos, the grouping transformation may be set to output a number n color photos for each black-and-white photo that arrives.

As another example, a composition of difference and grouping transformations may be employed to add minimal structure by grouping incoming data items (e.g., photos) until a change is detected (e.g., color then black-and-white). The change may close one group and form a new group. Thus, grouping transformations may be based on time as well as other criteria.

Another aspect of grouping transformations that differs from queries in relational databases is that consumers may want to have the same data in multiple locations. Relational databases do not support this structure. Using the incoming photo stream example, a grouping transformer may be set for three groups, friends, family, and holiday. The same photo may be output in more than one group, e.g., a photo of one's best friend and father together on Independence Day may be output in all three groups, while a photo of one's mother on the same holiday may be output in two groups.

As another example, a grouping transformer may be set to group news into economic news, health news, and breaking news. Breaking news on the stock market may be output as both breaking news and economic news, but news about a socialite would not appear in output for economic or health news, and a composition may render a threshold such that news about the socialite does not appear in the breaking news output, even when it is the most recent headline. Thus, multiple data items from a plurality of incoming social network data streams may be transformed in the context of windowing and grouping transformations.

Figure 10:
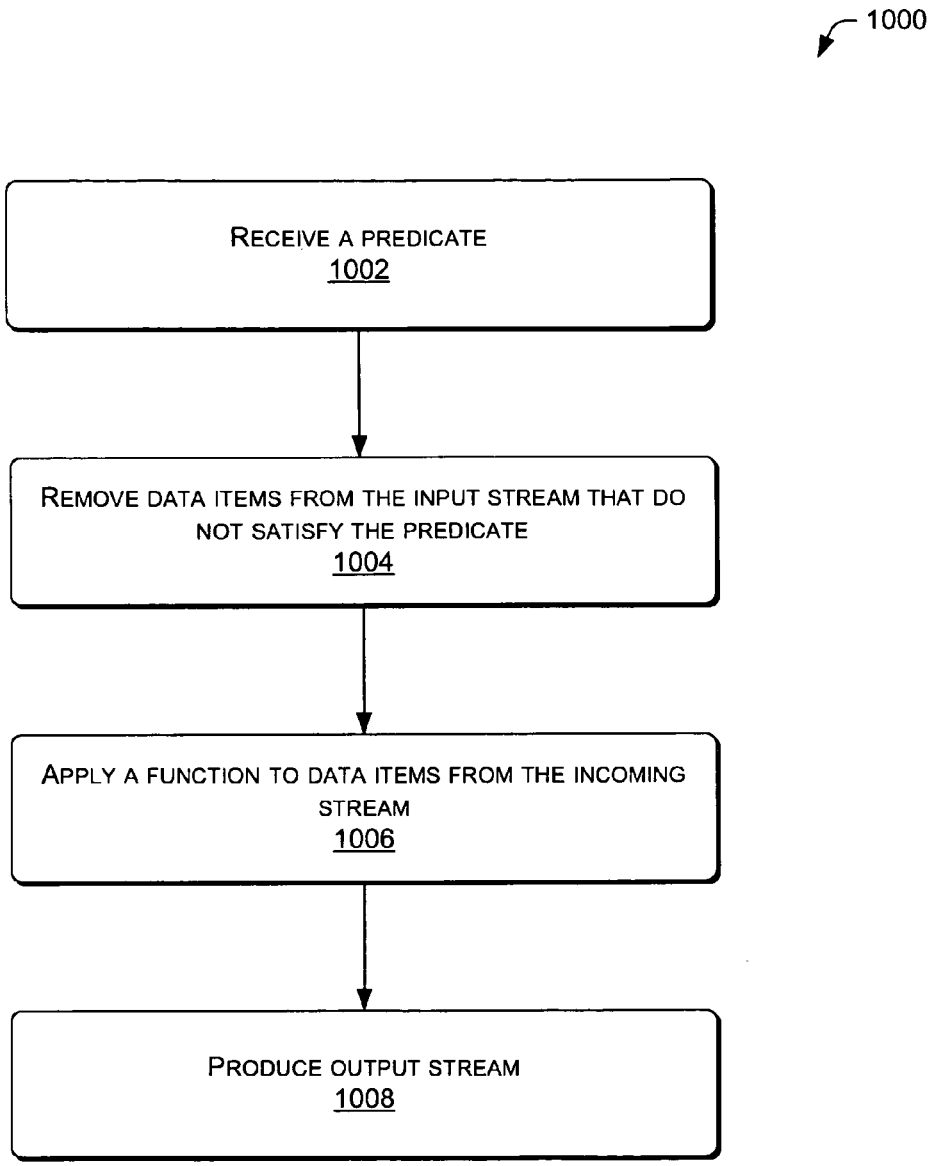
FIG. 10 is a flow diagram showing additional aspects of an illustrative process of implementing publish/subscribe mashups for social networks.

FIG. 10 shows an exemplary process 1000, which, in some embodiments may be incorporated in whole or in part in process 600 at 604 and/or 610. In some embodiments, a filter transformer receives a predicate at 1002 and data items from the incoming stream that do not satisfy the predicate are removed at 1004. In one implementation, an incoming data stream may be of photos, and a filter transformation may offer as an output stream only those photos corresponding to a predetermined location. Alternately, filter transformations may output only news about a set topic, tweets and emails from my friends containing a certain word, etc. Filter transformation may also be dynamic or based on a control stream. For example, based on the GPS coordinates of my cell phone, output photos, news, messages from my friends corresponding to that location. The photos, news, messages delivered will change based on the GPS location.

In some embodiments, a transform transformer applies a function to data items from the incoming stream at 1006. In aspects of several embodiments, a control stream facilitates the predicate for filter transformation, as discussed regarding 1004, varying over time and/or the transformation function 1006 varying over time such as when the control stream contains predicates as incoming data items and those data items are served as input values to the transformation function. In at least one embodiment, the data items of the incoming stream comprise, for example, news items. A filter transformation may select the headlines for the output stream. On the other hand, a transform transformation may process and provide the headline and a summary of a news item. Another aspect of this example concerns employing a composition involving a control stream including headline creation tools. This enables a user to manipulate the headlines being served. For example, when one is not satisfied with the headlines being selected or created from the news items, one can purchase another headline extraction tool to add to the control steam that influences the headlines served. Thus, based on consumer satisfaction, the consumer can change the control stream.

Another aspect of compositional transformation enabled by publish/subscribe mashups for social networks is while one stream of data is fed to a stream transformer, another stream of tools may feed the function to do the transformation. These tools may be linked together, interchangeable, and reconfigurable to serve the needs of consumers. Thus, as different and improved tools are developed, the new tools can be purchased and added to the control stream to affect the existing tools, such as the headline stream generator discussed above. In at least one embodiment, an entire social network may be updated via subscription services. For example, improvements of the tools are updated to transform a consumer's social network data. In this example, a timing transformer may control the time that updates are obtained. Furthermore, such an update transformation may be compositional, e.g., once updates are obtained, the updates may be grouped and applied in groups. In some embodiments, an output stream is produced at 1008.

Figure 11:
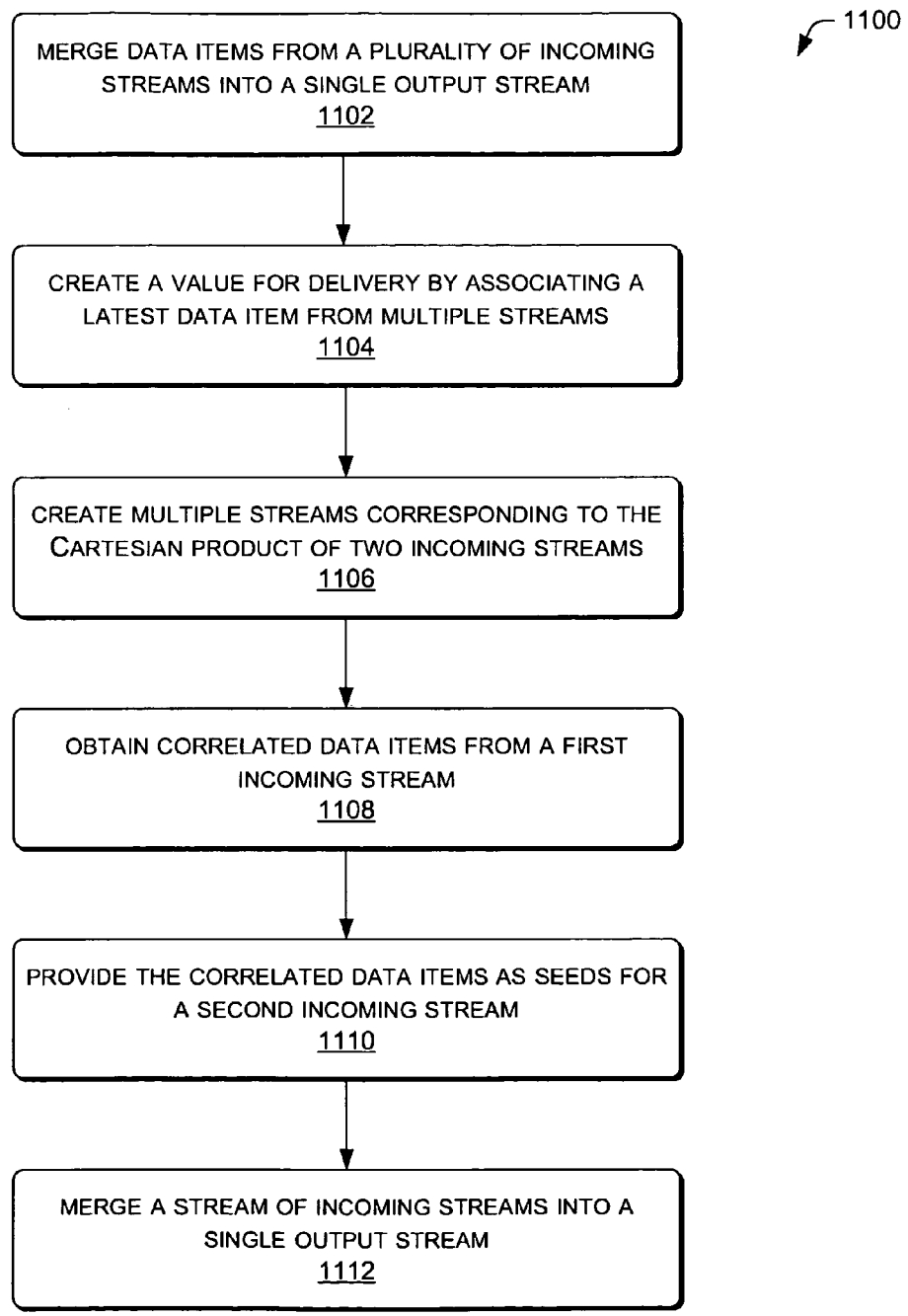
FIG. 11 is a flow diagram showing additional aspects of an illustrative process of implementing publish/subscribe mashups for social networks.

FIG. 11 shows an exemplary process 1100, which, in some embodiments may be incorporated in whole or in part in process 600 at 604 and/or 612. As discussed regarding 612, in multiple embodiments aggregation transformers combine a plurality of incoming streams into an output stream. Alternatively or in addition, in at least one embodiment, aggregation transformers may combine a plurality of incoming streams into a plurality of output streams. In some embodiments, a merge transformer merges data items from a plurality of incoming streams into a single output stream at 1102. For example, a first incoming stream may be made up of data items of type A and a second incoming stream may be made up of data items of type B. The output stream produced by the merge transformation is a stream of A and B, where each value is either A or B. The streams are merged to one stream. As another example, the merge transformation may be based at least in part on a control stream of Boolean values, such that data items from one of the plurality incoming data streams may be redirected to the output stream until the Boolean value changes, at which time the data items from another of the plurality incoming data streams will be redirected to the output stream. Compositionally, a Boolean value controlled merge transformation may be applied to more than two incoming data streams using windowing transformation, for example.

In multiple embodiments, a zipper transformer creates a value for delivery to the output stream by associating a latest data item from each of a plurality of incoming streams at 1104. In one embodiment, the latest data item from each of two incoming data streams are paired to create a new value that is delivered to the output stream. In this embodiment, no output stream is created until there is a pair, one from each input stream to produce an output stream. Composition is also enabled for zipper transformations. For example, a control stream may be generated using a tool that controls how matching occurs and can be updated or changed over time, such as adding a third input stream, etc. In this variation the zipper transformation waits to synchronize or coordinate between the three different streams until there is a value from each stream that are then combined to create the new value for the output stream.

Zipper transformations are particularly compelling in the context of social network data. For example, a consumer has several friends, and a first friend is reactionary, sending many micro-blog messages. The consumer need not see every micro-blog message from the reactionary friend. Using a zipper transformation, a message on the same topic from a second friend who is more measured in his/her communication, will create an output stream of the measured friend's message with a configurable sample (e.g., last, first, 1, 6, etc.) of the reactionary friend's messages. The zipper transformation may also be used in composition to preprocess messages from the first friend and coordinate a selection of those messages with the messages of the second friend.

Another example of the application of zipper transformations in composition combines the earlier photo example using a grouping transformation with the micro-blog message example, above. Photos from the friends and family may be grouped and tagged in a transformation. Then, in response to receiving a message from a person associated with one or more of the groups, a selection of photos from the associated group(s) may be released to the output stream. Of course, an additional transformation meter how many photos are released, or from which group they are released when a person is associated with multiple groups. For example, a message from one's mother may trigger release of a family photo group and/or a holiday photo group. Compositionally, the release as between the two groups may be controlled and/or, a new composed output stream may contain selections from both where the selections are based on the transformations employed.

In some embodiments, a join transformer creates multiple output streams corresponding to the Cartesian product of two incoming streams at 1106. For example, the join transformer pairs two data items satisfying a common condition. In an aspect of at least one embodiment, the join transformer returns a subset of the full Cartesian product based on arrival time of the data items from the incoming streams. In the context of social network data streams, the join transformation, using an example of photos and messages produces an output stream of pairs of messages and photos by joining data elements from the incoming streams based on a user identifier associated with the messages and the photos.

In some embodiments, a correlated join transformer obtains correlated data items from a first incoming stream at 1108. In several embodiments, the correlated join transformer may terminate the inner stream based on the timing of items on the outer stream. In an alternate embodiment, the correlated join transformer may terminate the inner stream based on arrival of items from the outer stream. In at least one embodiment, a correlated join transformer provides the correlated data items as seeds for a second incoming stream at 1110. An example composed building on the grouping/zipper composition above uses a correlated join transformation to provide granular control of the output stream. In this example, a configurable time transformation is applied to the grouping transformation on the photo stream, so that a message from a person, who matches tags in a photo group, triggers a release of photos to the output stream controlled to send the most recent n photos, photos from the last month, the oldest photos, etc.

In multiple embodiments, a flattening transformer merges a stream of incoming streams into a single output stream at 1112. In an aspect of at least one embodiment, merging a stream of incoming streams into a single output stream is based at least in part on arrival time of the data items from the incoming streams. In the context of social network data streams, this may be thought of as a merged nesting of streams. When a data item arrives on any of the incoming streams, the flattening transformer output is a confluence as a single stream. Compositionally, the single stream may serve as an incoming stream in additional transformations.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claims. For example, in at least one embodiment, process 500 as discussed regarding FIG. 5, is performed independently of processes 600, 700, 800, 900, and 1000 as discussed regarding FIGS. 6, 7, 8, 9, and 10. However, in other embodiments, performance of one or more of the processes 600, 700, 800, 900, and 1000 may be incorporated in, or performed in conjunction with, process 500. For example, process 700 may be performed in lieu of blocks 504 and/or 506 of FIG. 5.

I claim:

1. A social network data stream transformer system facilitating publish/subscribe mashups for social networks, the system comprising:
    a processor;
    a memory operably coupled to the processor, the memory storing components executable by the processor, the components comprising:
        an endpoint adapter comprising a source conversion adapter configured to facilitate data sources converting a sequential data source into a data-driven publisher, wherein the sequential data source comprises a relational database;
        one or more of a plurality of transformers receiving incoming streams from a plurality of publishers thereby automating control of data items from the plurality of publishers, the plurality of transformers comprising:
            timing transformers configured to modify temporal behavior of one or more of the incoming streams;
            delay transformers configured to delay an output of one or more incoming streams for a predetermined interval of time based at least in part on the timing transformers;
            windowing transformers configured to package together multiple data items from the one or more of the incoming streams based at least in part on predetermined criteria,
            difference transformers configured to monitor the one or more incoming streams for change, the change being determined by comparing the one or more incoming streams to previous related incoming streams and to create an output stream that comprises only of the determined change based at least in part on predetermined criteria;
            modifying transformers configured to modify the data items in the one or more of the incoming streams to create an output stream; and
            aggregation transformers configured to combine a plurality of the one or more incoming streams into the output stream;
        an output interface configured to serve the output stream to subscribers, whereby the output stream comprises a stream created via publish/subscribe mashups implementing the plurality of transformers.

2. The system as recited in claim 1, wherein the endpoint adapter further comprises
    a sink conversion adapter configured to convert a data-driven subscriber into a demand-driven subscriber.

3. The system as recited in claim 1, wherein the incoming streams comprise:
    one or more of:
        a blog stream;
        a micro-blogging stream;
        a social network stream;
        an instant messaging stream;
        a photo stream;
        an email stream; or
        a rich site summary (RSS) feed; and
    one or more of:
        a short messaging service (SMS) message stream;
        a multimedia messaging service (MMS) message stream;
        a file sharing stream; or
        a transformed output stream.

4. The system as recited in claim 1, wherein the plurality of publishers comprise:
    one or more of:
        a blog publisher;
        a micro-blogger;
        a social network site;
        an instant messaging service;
        a photo sharing service;
        an email service; or
        a rich site summary (RSS) service; and
    one or more of:
        a short messaging service;
        a multimedia messaging service;
        a file sharing service; or
        a transformation service.

5. The system as recited in claim 1, wherein the timing transformers comprise a sample transformer configured to sample the incoming stream at predetermined intervals and publish a selected data item from the incoming stream during a predetermined sampling period.

6. The system as recited in claim 1, wherein the windowing transformers further comprise a grouping transformer configured to partition the incoming stream into multiple output streams based at least in part on a grouping criterion.

7. The system as recited in claim 1, wherein the modifying transformers comprise a filter transformer configured to receive a predicate and remove data items from the incoming stream that do not satisfy the predicate to produce the output stream.

8. The system as recited in claim 1, wherein the aggregation transformers comprise at least one of:
    a zipper transformer configured to create a value for delivery to the output stream by associating a latest data item from each of the plurality of incoming streams; or
    a join transformer configured to create multiple output streams corresponding to a Cartesian product of two incoming streams.

9. A method comprising:
    under control of a computing device configured with processor executable instructions, receiving incoming streams comprising social network data from a plurality of publishers;

monitoring at least one of the incoming streams for changes over a predetermined interval of time, the changes being determined by comparing the at least one of the incoming streams to previous related incoming streams;

transforming the at least one of the incoming streams via transformations comprising:
- creating an output stream comprising only of the determined changes over the predetermined interval of time;
- modifying the data item from the at least one incoming stream to create an output stream; and serving the output stream.

10. The method as recited in claim 9, further comprising adapting an endpoint, wherein adapting the endpoint comprises at least one of:
- converting a demand-driven source into a data-driven publisher;
- converting a sequential data source into a data-driven publisher, wherein the sequential data source comprises a relational database; or
- converting a data-driven subscriber into a demand-driven subscriber.

11. The method as recited in claim 9, wherein the incoming streams comprise:
one or more of:
- a blog stream;
- a micro-blogging stream;
- a social network stream;
- an instant messaging stream;
- a photo stream;
- an email stream; or
- a rich site summary (RSS) feed; and one or more of:
- a short messaging service (SMS) message stream;
- a multimedia messaging service (MMS) message stream;
- a file sharing stream; or
- a transformed output stream.

12. The method as recited in claim 9, further comprising transforming at least one of the incoming streams via transformations further comprising:
- modifying temporal behavior of at least one incoming stream; and
- aggregating a plurality of the incoming streams into the output stream.

13. The method as recited in claim 12, wherein modifying the temporal behavior of an incoming stream comprises spreading output of the data items from the at least one incoming stream over time with a consistent time delta between the data items.

14. The method as recited in claim 12, wherein aggregating a plurality of the incoming streams into the output stream comprises at least one of:
- creating a value for delivery to the output stream by associating a latest data item from each of the plurality of incoming streams;
- creating multiple output streams corresponding to a Cartesian product of two incoming streams; or
- obtaining correlated data items from a first incoming stream and providing the correlated data items as seeds for a second incoming stream to produce the output stream.

15. The method as recited in claim 9, wherein modifying data items from the at least one incoming stream to create an output stream comprises receiving a predicate and remove data items from the at least one incoming stream that do not satisfy the predicate to produce the output stream.

16. The method as recited in claim 9, wherein serving the output stream comprises serving the output stream to subscribers.

17. One or more computer-readable storage devices having computer executable instructions encoded thereon, the computer executable instructions, upon execution configuring a processor to perform operations comprising:

receiving incoming streams comprising disparate social network data from a plurality of publishers;

transforming at least one of the incoming streams via transformations comprising:
- modifying temporal behavior of the at least one incoming stream, the modifying temporal behavior comprising:
  - monitoring the at least one incoming stream for change at predetermined intervals, the change being determined by comparing the at least one incoming stream to previous related incoming streams, and creating a data item comprising only of the change over the predetermined intervals; and
- modifying the data item from the at least one incoming stream to create an output stream; and serving the output stream.

18. The one or more computer-readable storage devices of claim 17, further comprising transforming at least one of the incoming streams via transformations comprising:
- packaging multiple data items from the at least one incoming stream based at least in part on time; and
- aggregating a plurality of the incoming streams into a plurality of output streams.

19. The one or more computer-readable storage devices of claim 17, further comprising transforming at least one of the incoming streams via transformations performed by a flattening transformer, the transformations comprising:
- aggregating a plurality of the incoming streams into the output stream, and
- merging a stream of incoming streams into a single output stream based at least in part on arrival time of the data items from the incoming streams to create a nested stream.

20. The method as recited in claim 9, the transforming the at least one of the incoming streams via transformations further comprising packaging multiple data items from a plurality of incoming streams based at least in part on the predetermined intervals of time, the packaging the multiple data items being facilitated by a control stream, wherein packaging multiple data items from the incoming stream based at least in part on time comprises at least one of:
- monitoring the data items from the at least one incoming stream and accumulating the data items from the at least one incoming stream to produce the output stream; or
- partitioning the at least one incoming stream into multiple output streams based at least in part on a grouping criterion.

* * * * *